United States Patent Office 2,891,863
Patented June 23, 1959

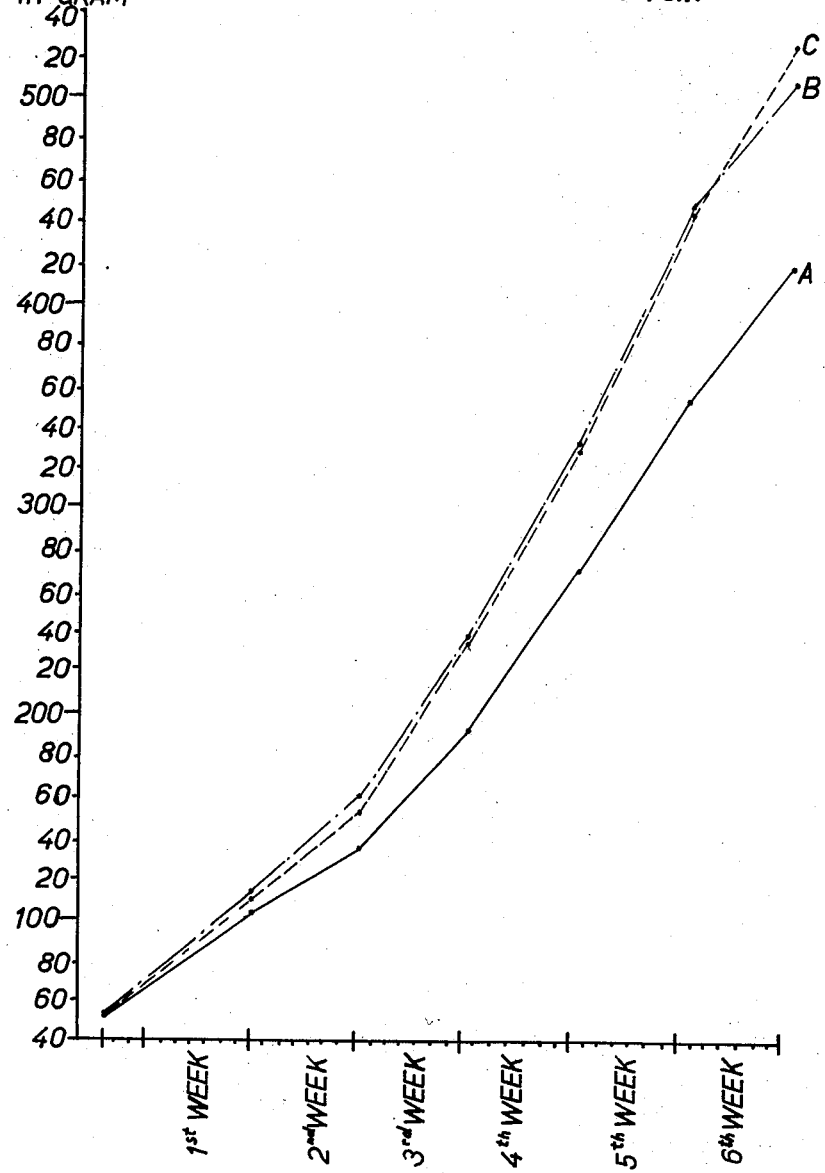

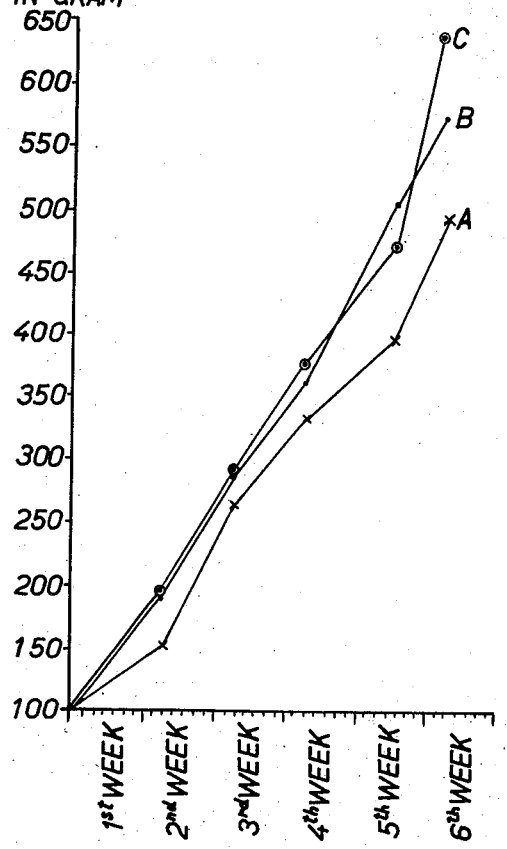

2,891,863
FOOD ADDITIVES

Winfried Kruckenberg, Leverkusen-Bayerwerk, Germany, assignor to Farbenfabriken Bayer Aktiengesellschaft, Leverkusen, Germany, a corporation of Germany Application May 24, 1955, Serial No. 510,719

Claims priority, application Germany May 25, 1954

12 Claims. (Cl. 99—2)

This invention relates to growth promoting feeding stuffs.

It is a well known fact that a number of so-called essential amino acids (for example lysine) must be supplied to the animal organism. It is also well known that these essential amino acids are sometimes present in too small a quantity in vegetable protein and that consequently the full value of the food cannot be utilized when only vegetable foodstuffs are supplied. If these lacking amino acids, for example lysine, are added artificially to the vegetable feeding stuff, the latter is better utilized, that is to say, more rapid growth can be obtained with the same amount of feeding stuff.

It is an object of the present invention to provide novel growth promoting feeding stuffs. Another object is to provide growth promoting feeding stuffs which are more effective than those known up to now. A further object is to provide food additives which are easily obtainable. Still further objects will appear hereinafter.

According to this invention I have found that better utilization of vegetable feeding stuffs, i.e. more rapid growth, can also be obtained if, instead of using lysine, the feeding stuff contains α-aminobutyric acid or physiological initial products thereof, such as α-hydroxybutyric acid, or compounds which are probably secondary products of α-aminobutyric acid, such as α-amino-γ-hydroxybutyric acid.

Accordingly, the present invention provides a process for the production of a rapid growth promoting vegetable feeding stuff, which comprises incorporating α-aminobutyric acid or a physiological initial or secondary product thereof in a vegetable feeding stuff.

This discovery is very surprising, since α-aminobutyric acid and α-hydroxybutyric acid or α-amino-γ-hydroxybutyric acid do not belong to the essential amino acids and the presence thereof in vegetable and animal protein is generally disputed. It is also surprising that these compounds are very much more effective than lysine, since the same increase in the rate of growth is obtained with the same basic foodstuffs by adding only 0.14% of d,l-α-aminobutyric acid, or of α-hydroxybutyric acid or α-amino-γ-hydroxybutyric acid instead of 0.5% of lysine.

Since α-aminobutyric acid and its derivatives can be obtained more easily than the feeding stuff additives so far proposed, the use thereof constitutes an important technical advance.

The following examples illustrate results obtained by the use of the new feeding stuffs.

*Example 1*

30 white Leghorn chicks of the same strain were in each case fed in 3 concurrent series of experiments and under the same conditions with the same amount of feeding stuff per day. Three batches of feed were used as follows:

(A) Pure vegetable protein (no additive)

(B) The vegetable protein as set forth in (A) containing an additional 0.74% of ε-butyryl lysine (corresponding to 0.5% of lysine), (C) The pure vegetable protein as set forth in (A) containing an additional 0.14% of α-aminobutyric acid.

After four weeks, the weight of the birds which had been fed with an additive of α-aminobutyric acid and butyryl lysine was considerably greater than that of the birds fed with foods not containing these additives (see the enclosed graph I, in which A=pure vegetable protein, B=the vegetable protein with an additional 0.74% of ε-butyryl lysine (corresponding to 0.5% of lysine), and C=the pure vegetable protein with an additional 0.14% of α-aminobutyric acid).

*Example 2*

30 white Leghorn chicks of the same strain were in each case fed in 3 concurrent series of experiments and under the same conditions with the same amount of feeding stuff per day. The different batches of feeding stuff were as follows:

(A) Pure vegetable protein (no additive)

(B) Pure vegetable protein of (A) with an additional 0.14% of α-hydroxybutyric acid, (C) The pure vegetable protein of (A) with an additional 0.14% of α-amino-γ-hydroxybutyric acid.

After four weeks, the weight of the birds which had been fed with an additive of α-hydroxybutyric acid respectively α-amino-γ-hydroxybutyric acid was considerably greater than that of the birds fed with foods not containing these additives (see the enclosed graph II, in which A=pure vegetable protein, B=the pure vegetable protein with an additional 0.14% of α-hydroxybutyric acid and C=pure vegetable protein with an additional 0.14% of α-amino-γ-hydroxybutyric acid).

I claim:

1. A poultry and animal feed of vegetable matter deficient in lysine containing as an additive an effective quantity of a member selected from the group consisting of α-aminobutyric acid, α-hydroxybutyric acid and α-amino-γ-hydroxybutyric acid sufficient to substantially compensate for said lysine deficiency.

2. Feed according to claim 1, in which said group member is present in amount of about 0.14% by weight.

3. A poultry and animal feed of vegetable matter deficient in lysine containing as an additive an effective quantity of α-aminobutyric acid, sufficient to substantially compensate for said lysine deficiency.

4. A poultry and animal feed of vegetable matter deficient in lysine containing about 0.14% by weight of α-aminobutyric acid.

5. A poultry and animal feed of vegetable matter deficient in lysine containing as an additive an effective quantity of α-hydroxybutyric acid, sufficient to substantially compensate for said lysine deficiency.

6. A poultry and animal feed of vegetable matter deficient in lysine containing about 0.14% by weight of α-hydroxybutyric acid.

7. A poultry and animal feed of vegetable matter deficient in lysine containing as an additive an effective quantity of α-amino-γ-hydroxybutyric acid sufficient to substantially compensate for said lysine deficiency.

8. A poultry and animal feed of vegetable matter deficient in lysine containing about 0.14% by weight of α-amino-γ-hydroxybutyric acid.

9. Process for the production of a rapid growth promoting poultry and animal feed of vegetable matter which comprises incorporating into a poultry and animal feed of vegetable matter deficient in lysine, a member selected from the group consisting of α-aminobutyric acid, α-hydroxybutyric acid and α-amino-γ-hydroxybutyric acid, in an effective quantity sufficient to substantially compensate for said lysine deficiency.

10. Process according to claim 9 in which said group member is α-aminobutyric acid.

11. Process according to claim 9 in which said group member is α-hydroxybutyric acid.

12. Process according to claim 9 in which said group member is α-amino-γ-hydroxybutyric acid.

References Cited in the file of this patent

UNITED STATES PATENTS

| 2,623,824 | Gaudry | Dec. 30, 1952 |
| 2,727,065 | Anagnostopoulas | Dec. 13, 1955 |
| 2,745,745 | Blake | May 15, 1956 |

OTHER REFERENCES

Rosenberg: Chemistry and Physiology of Vitamins, Interscience Publ., N.Y., 1942, pp. 540–1.